Feb. 3, 1970  G. WAGNER ET AL  3,492,683
BRIDGE BUILDER
Filed Feb. 14, 1968
8 Sheets-Sheet 1
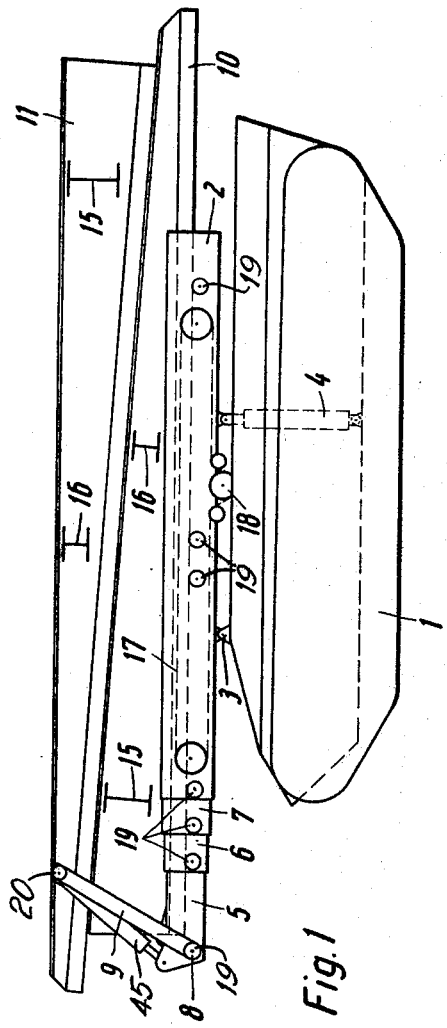
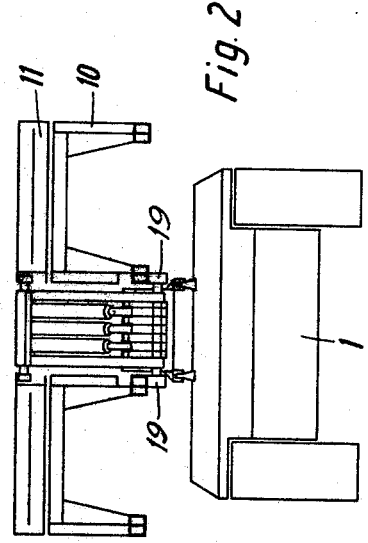
Inventors:
Gerhard Wagner
Walter Hinzel

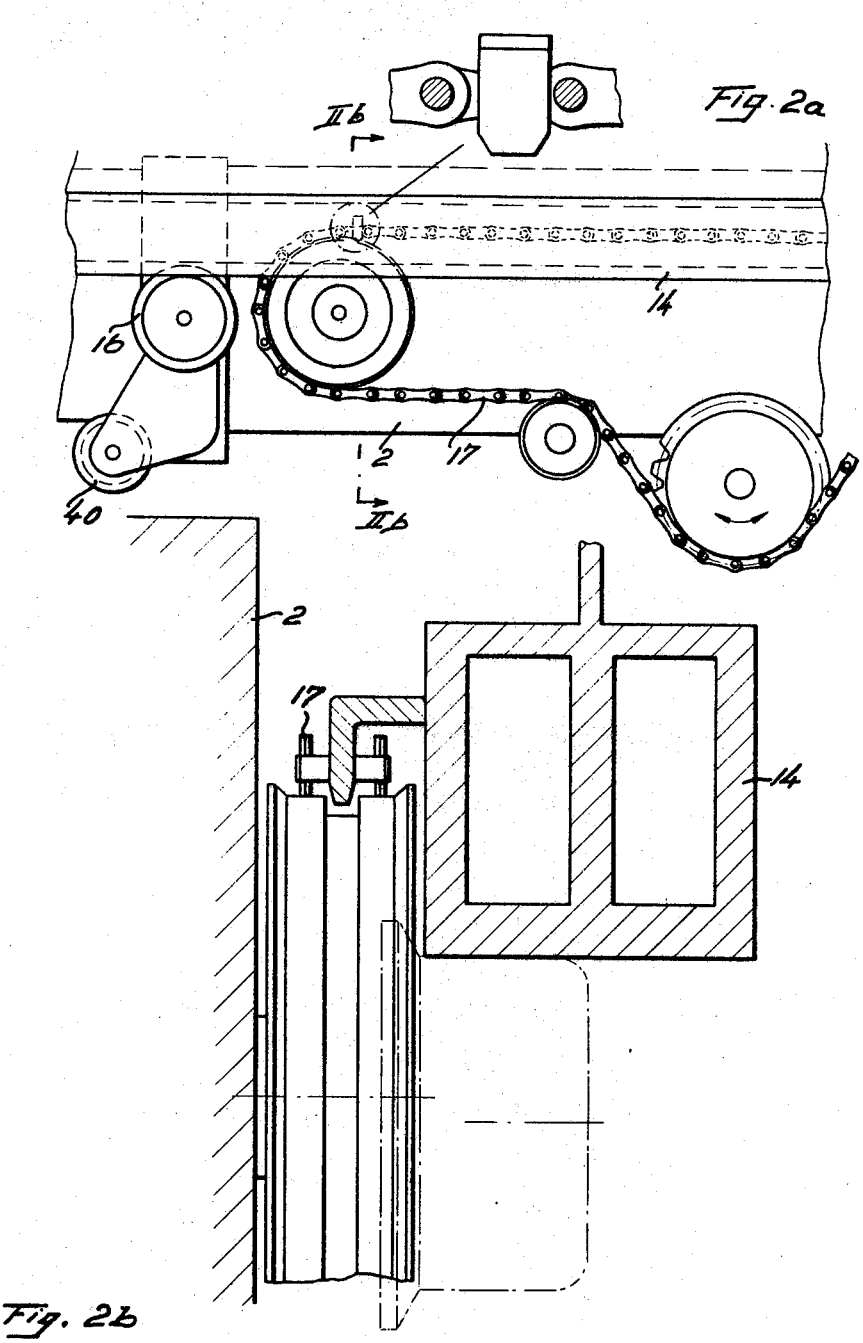

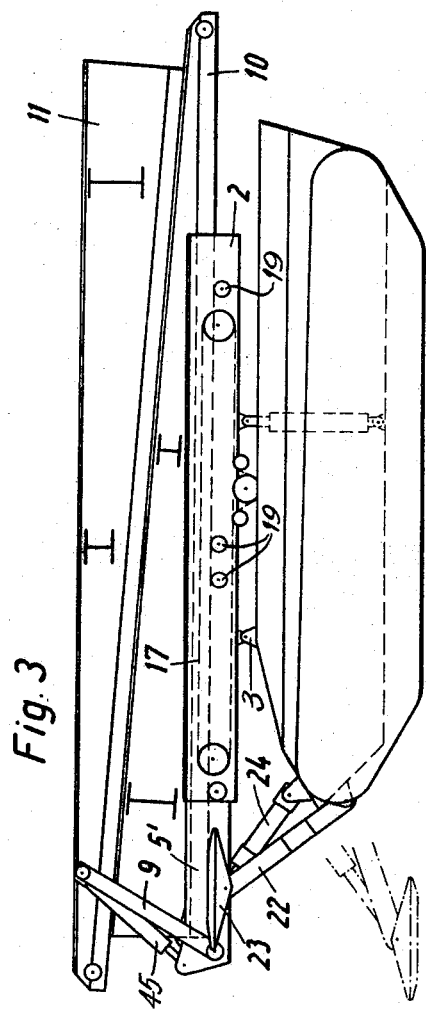
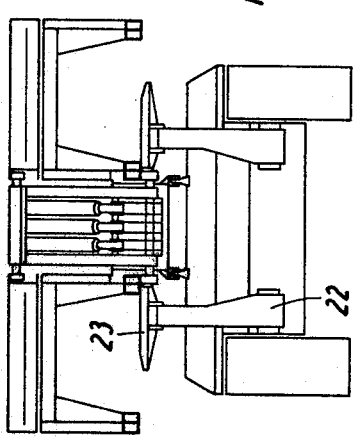

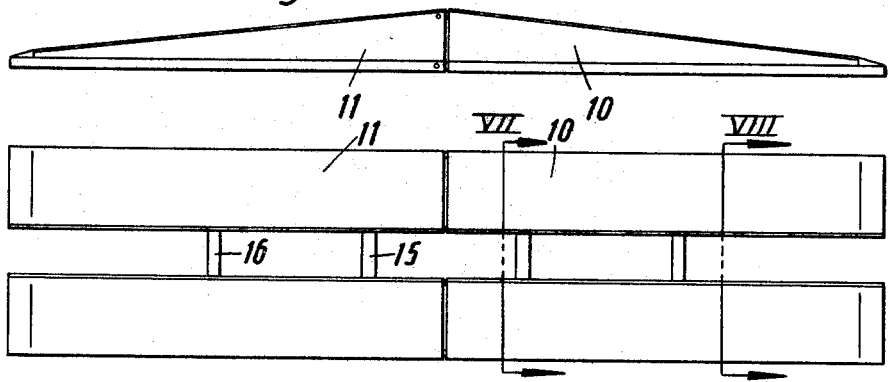
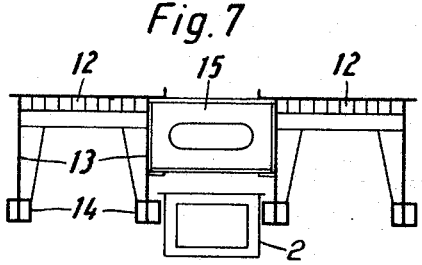
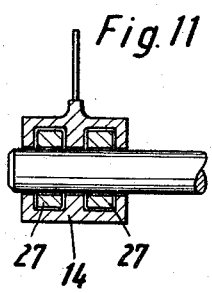
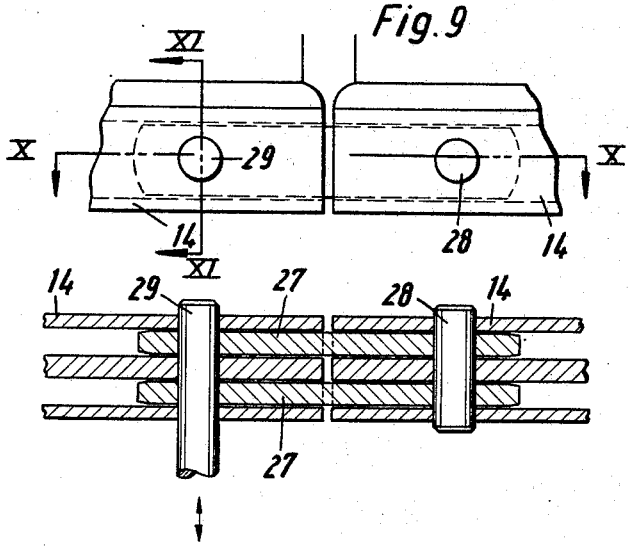

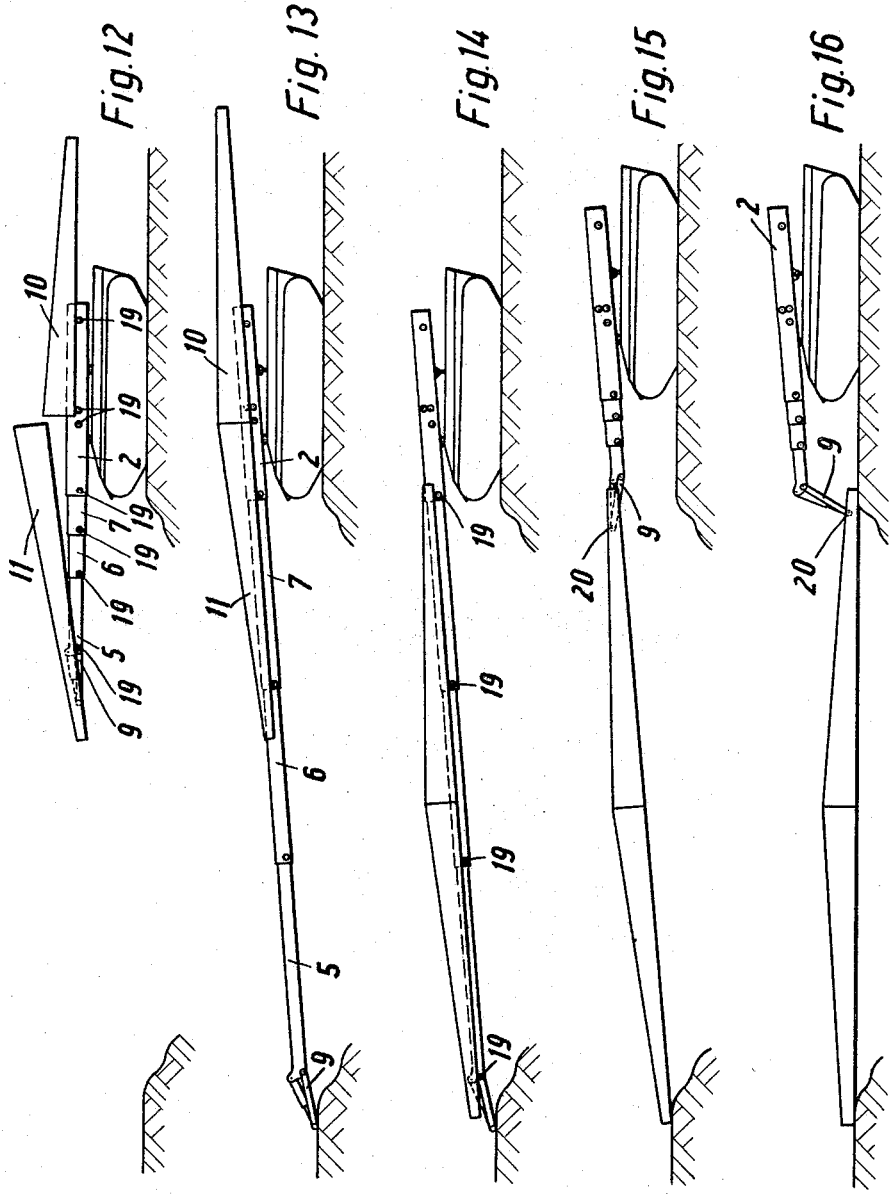

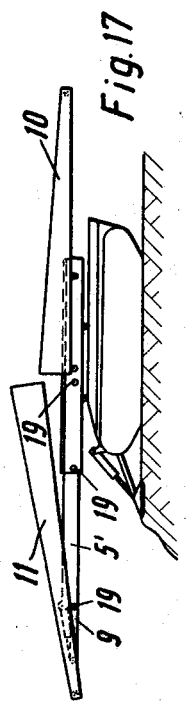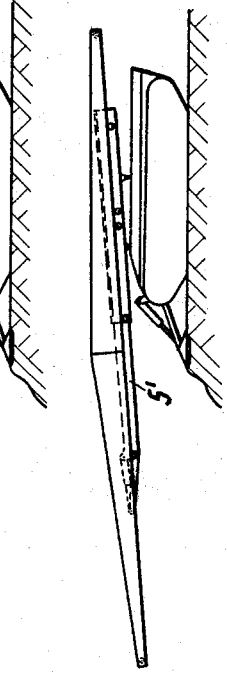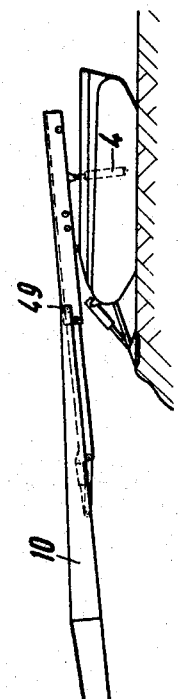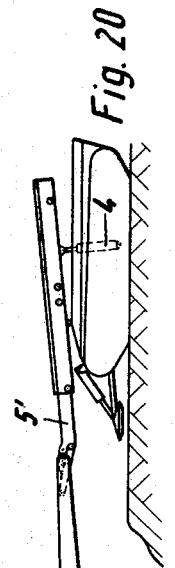

Inventors:
Gerhard Wagner
Walter Kinzel

Feb. 3, 1970  G. WAGNER ET AL  3,492,683
BRIDGE BUILDER

Filed Feb. 14, 1968  8 Sheets-Sheet 8

Inventors:
Gerhard Wagner
Walter Hinzel
By

United States Patent Office 3,492,683
Patented Feb. 3, 1970

3,492,683
BRIDGE BUILDER
Gerhard Wagner and Walter Kinzel, Mainz, Germany, assignors to Klockner-Humboldt-Deutz Aktiengesellschaft, Cologne-Deutz, Germany
Filed Feb. 14, 1968, Ser. No. 705,367
Claims priority, application Germany, Feb. 15, 1967, K 61,430
Int. Cl. E01d 1/00
U.S. Cl. 14—1       17 Claims

ABSTRACT OF THE DISCLOSURE

A bridge builder comprising a vehicle, which includes at least two bridge sections which are superimposed during the transport thereof and are adapted to be moved relative to each other from said superimposed position into an aligned position so as to form a bridge structure, while a beam extensible in the longitudinal direction of the bridge sections and pivotally connected to the vehicle is supported by the latter and is connected to the upper one of the bridge sections in superimposed position thereof in such a way as to be operable to move the upper bridge section into alignment with the adjacent bridge section for building up a bridge structure.

---

The present invention relates to a bridge builder, especially for military purposes, which comprises a vehicle, and at least two bridge sections adapted to be composed to a bridge and during the transport mounted on the vehicle in superimposed position, while means are provided for composing said bridge sections and building the bridge.

According to a heretofore known implement of the type involved as disclosed in Belgian Patent 436,594, the vehicle has superimposed bridge sections which are telescopically displaceable over the obstacle to be bridged, said bridge sections guiding each other. The vehicle which is provided with a ramp will, after the bridge has been built, remain at the respective place, in other words, it is not able to drive over the respective obstacle to be bridged.

According to another heretofore known suggestion, the upper one of two superimposed bridge sections is adapted to be advanced with regard to the lower bridge section by means of rollers while the end of the roller guiding means provided at the lower bridge section follows an inclined joint at which the bridge sections are subsequently firmly coupled. The composed bridge is by means of rollers on a boom or cantilever mounted on a vehicle advanced over the obstacle and is subsequently lowered by a tilting movement of the boom. The vehicle is thus free and is able to drive over the bridge.

The present invention is likewise intended to meet the requirements that the bridge consist of individual, preferably two, sections which during the transport thereof are superimposed upon the vehicle so that the bridge will be of sufficient length. Furthermore, the requirement is to be met that the bridge sections for purposes of assembling the same are adapted to be displaced horizontally relative to each other so that the bridge will not unduly protrude from the terrain and offer a conspicuous target to the enemy.

With the above mentioned basic requirements, it is an object of the present invention to so design a bridge builder of the above mentioned general character that the bridge can be picked up by the transporting vehicle after the latter has moved over the bridge.

It is another object of this invention to provide a bridge builder as set forth in the preceding paragraph, which will be simple in construction and easy to handle.

These and other objects and advantages of the invention will appear more clearly from the following specification in connection with the accompanying drawings, in which:

FIG. 1 diagrammatically illustrates in side view a bridge builder with a two-sectional bridge and movable beam, the bridge sections being shown in superimposed or transporting position.

FIG. 2 is a front view of the bridge builder shown in FIG. 1.

FIG. 2a shows in view a lower bridge section with an actuating chain connected thereto.

FIG. 2b is a section along the line IIb—IIb of FIG. 2a, but on a larger scale than the latter.

FIG. 3 is a side view similar to that of FIG. 1 of a modified bridge builder which differs from that of FIGS. 1 and 2 in that it has only one extensible beam.

FIG. 4 is a front view of the bridge builder shown in FIG. 3.

FIG. 5 is a side view of the composed two-sectional bridge but on a smaller scale than that of FIGS. 1 to 4.

FIG. 6 shows a top view of the bridge of FIG. 5.

FIG. 7 is a section through FIG. 6 taken along the line VII—VII thereof.

FIG. 8 is a vertical section through FIG. 6 taken along the line VIII—VIII thereof.

FIG. 9 is a side view of a fish plate connection between the ends of the lower chord of the bridge section.

FIG. 10 shows in horizontal section the connection of FIG. 9, said section being taken along the line X—X of FIG. 9.

FIG. 11 is a vertical section through FIG. 9 taken along the line XI—XI thereof.

FIGS. 12 to 16 respectively illustrate various phases of composing and building the bridge by means of a telescopically extensible beam according to FIGS. 1 and 2.

FIGS. 17 to 21 respectively illustrate various phases of composing and building the bridge with a single extensible beam according to FIGS. 3 and 4.

Figure 22:
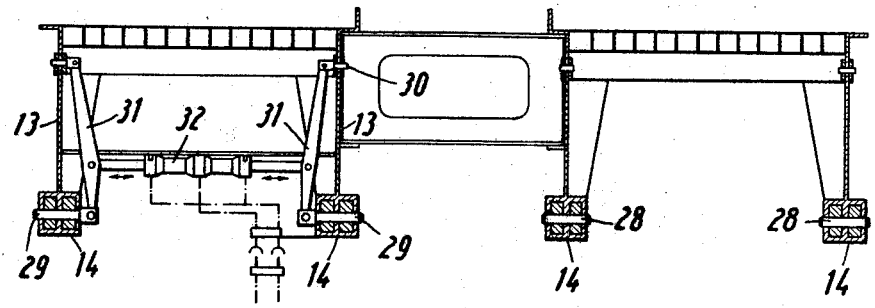

FIG. 22 is a vertical cross-section through a bridge section at the connecting area with a device for inserting the connecting bolts.

Figure 23:
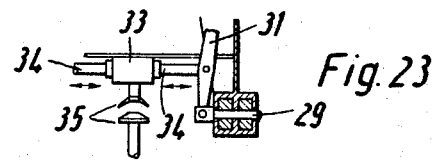

FIG. 23 is a section similar to that of FIG. 22 but with a different device for inserting the connecting bolts.

Figure 24:
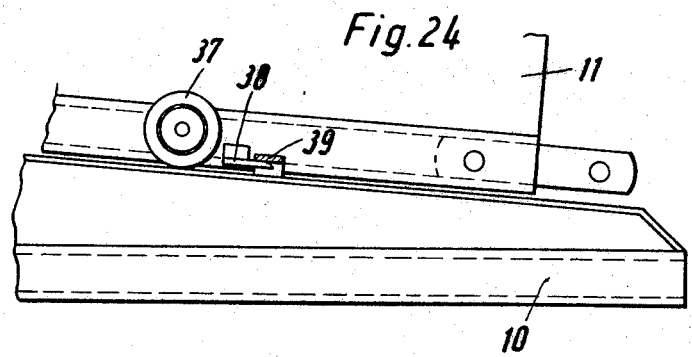

FIG. 24 shows on an enlarged scale the ends of the superimposed bridge sections with means for mutually securing the positions thereof.

Figure 25:
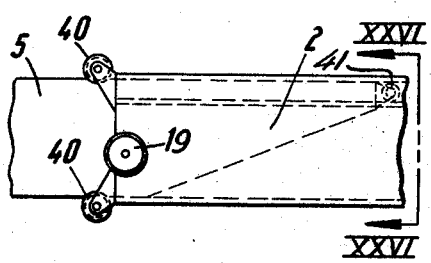

FIG. 25 shows a portion of a side view of the two-sectional beam of the bridge builder according to FIGS. 3 and 4.

Figure 26:
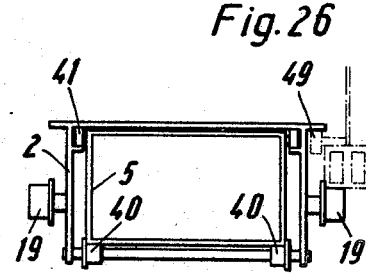

FIG. 26 is a cross-section through FIG. 25 taken along the line XXVI—XXVI of FIG. 25.

Figure 27:
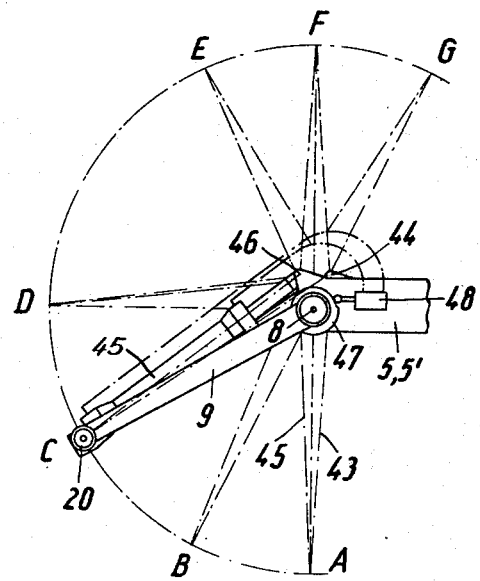

FIG. 27 is a side view of a tiltable arm at the front end of the extensible beam.

Figure 28:
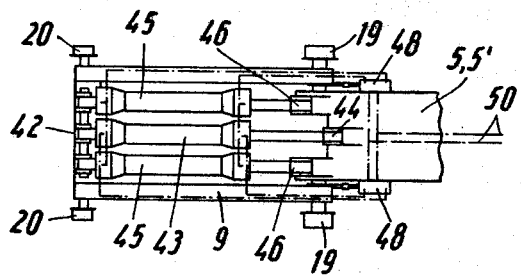

FIG. 28 is a top view of the arrangement shown in FIG. 27.

Figure 29:
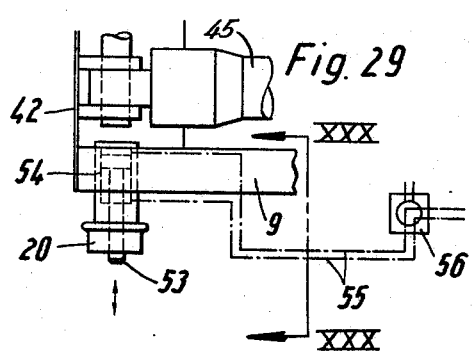

FIG. 29 is a partial top view of a detail of the connection of the tiltable arm at the upper bridge section.

Figure 30:
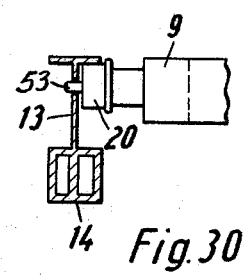

FIG. 30 is a partial transverse section through FIG. 29 taken along the line XXX—XXX of FIG. 29.

Referring now to the drawings in detail, the bridge builder illustrated in FIGS. 1 and 2 has above the track laying vehicle 1 arranged a box-shaped beam 2 which is pivotally journalled for pivotal movement about a horizontal pivot or shaft 3. This pivotal movement is adapted to be effected by a hydraulic cylinder piston system 4. Within the beam 2 there are telescopically extensibly guided three additional beam sections 5, 6 and 7 which similar to the beam 2 are of rectangular cross-section. The front beam section 5 carries an arm 9 which is pivotable about a horizontal pivot or shaft 8. The bridge sections 10 and 11 which are of substantially identical design are carried or supported in effect in a superimposed manner upon the non-displaceable beam 2. The bridge sections, in conformity with their bending stress, have their cross-sections increase in height toward the connecting area. The ends of the maximum and lowest height are respectively located above each other.

FIGS. 5–8 indicate that the bridge sections comprise two bridge beams each carrying a track 12 with two plate-shaped webs 13 and lower chords 14 having the shape of a double box. The bridge beams which are arranged adjacent to each other are connected to each other in a torsion elastic manner by means of transverse struts 15, 16 so that when the bridge rests on an uneven ground, an equalization within certain limits will be possible under the influence of the load.

The individual phases of the bridge building are diagrammatically illustrated in FIGS. 12 to 16. By telescopically extending the beam sections 5–7, the arm 9 which at the start (see FIG. 1) is directed upwardly will have advanced the upper bridge section 11 to approximately its coupling position. At the end of this displacement, the arm 9 is pivoted forwardly so that the bridge section 11 is rested on the rollers 19 indicated in FIGS. 1, 2, 3, and arranged at both sides of the beam section 5 indicated in FIG. 28, for example, while the rear end of the bridge section 11 is held in spaced relationship above the beam. By means of a slight tilting movement of the arm 9 in upward direction, the bridge section 11 is deposited upon the further rollers 19 at the front end of the beam sections 2, 6 and 7.

During the advancing movement of the upper bridge section 11, simultaneously the lower bridge section 10 is moved into the position shown in FIG. 12. This is effected by means of two endless chains 17 (FIG. 1) arranged laterally on the non-displaceable beam section 2 so that the center of gravity of the bridge remains over the vehicle. The chains 17 are driven from the interior of the vehicle through the intervention of the sprocket wheel 18, and individual teeth at the bottom side of the bridge mesh with the upper section of the chain whereby the bridge will be advanced.

FIG. 13 shows the bridge sections 10 and 11 in interconnected and built-up condition. After the arm 9 is detached from the bridge section 11, the beam 6 is extended completely and the end of the tiltable arm 9 rests on the opposite bank. The non-displaceable beam 2 is to this end slightly pivoted downwardly.

According to FIG. 14, the bridge 10, 11 is over rollers 19 of the individual beam sections advanced over the obstacle by means of the driving chains 17. Subsequently, the front end is deposited on the bank by a slight upward pivoting of the arm 9. According to FIG. 15, the telescopically extensible sections of the beam are retracted to such an extent that that end of the bridge which is adjacent to the vehicle rests by lateral flanges only on the rollers 20 at the end of the tilting arm 9. According to FIG. 16, arm 9 has been tilted downwardly whereby the bridge is rested upon that bank which is adjacent to the vehicle. The vehicle can then move back and subsequently, after a slight tilting of the arm 9 or beam 2 in upward direction, will be able to move over the bridge. After the bridge has thus performed its purpose, it can be picked up again from the other bank by reversing the procedure outlined above in connection with FIGS. 12 to 15.

The bridge builder according to FIGS. 3 and 4 differs from that of FIGS. 1 and 2 primarily in that it has only one beam section 5' which is adapted to be moved out of the stationary beam 2. The beam section 5' has at its free end a tiltable arm 9. The length of the extended beam, therefore, is only half as long as the bridge length. Therefore, the free end of the beam cannot be supported while it is being moved across the obstacle. The length of the beam, however, is sufficient to absorb the forces of the bridge exerted upon the rollers of the beam. On the other hand, the free extension of the bridge makes it necessary to support the front end of the vehicle in order to prevent the weight of the freely protruding end of the bridge from tilting the vehicle over. To this end, two supporting arms 22 (FIG. 3) with supporting plates 23 are provided at the front end of the vehicle. These arms 22 are adapted by means of a hydraulic cylinder piston system 24 to be tilted out of the driving position into a supporting or working position and vice versa. In all other respects, the bridge builder of FIGS. 3 and 4 corresponds to that of FIGS. 1 and 2.

FIGS. 17–21 diagrammatically illustrate the bridge building operation with the bridge builder according to FIGS. 3 and 4. According to FIG. 17, which otherwise corresponds to that of FIG. 12, the beam section 5' has been completely extended whereas the lower bridge portion 10 has been retracted into its coupling position by means of the endless chains 17. The connection of the bridge sections is effected after a slight tilting movement of the arm 9 whereby the bridge section 11 is rested upon the rollers 19 of the beam 2.

According to FIG. 18 the bridge has been advanced partially, and according to FIG. 19 the bridge has been advanced completely. The depositing of the free bridge end is effected exclusively by tilting the beam 2 by means of the hydraulic cylinder piston system 4.

After the free end of the bridge has been rested on the bank, the extensible beam section 5' is pulled back. The depositing of that bridge end which is adjacent to the vehicle is effected in conformity with FIGS. 20 and 21 the procedure of which corresponds to that described above in connection with FIGS. 15 and 16.

The fishplate connection according to FIGS. 9–11 in the double box-shaped lower chords 14 comprises at one side, which means in the track section of each bridge section, bolts 28 which are firmly inserted into bores of the lower chords and fishplates 27. At the other side where the protruding fishplates during the assembly were moved into the cavities of the lower chords, bolts 29 are provided which can be pushed through.

The fixed bolts 28 and the insertable bolts 29 are alternately symmetrically arranged on the two bridge sections as is shown in cross-section in FIG. 22. The insertable bolts 29 of the lower chords are together with the insertable bolts 30 of a lighter fishplate connection actuated by a hydraulic double cylinder 32 in the upper range of the plates 13 through the intervention of connecting levers 31.

FIG. 23 shows a modification of the mechanical actuation of the insertable bolts by means of a worm wheel drive 33 and threaded spindles 34. The drive is effected from the vehicle through a clutch 35 adapted selectively to be engaged and disengaged. According to FIG. 24, the high end of the bridge section 11 will in its transporting position rest on the track of the lower bridge section 10 by means of rollers 37. In the illustrated end position which is held by the advancing chain 17, one fishplate 38 of the upper bridge section extends below a transverse web 39 of the lower bridge section and thereby assures the mutual support, whereas the other end is secured by the tiltable arm 9 of the extensible beam 5, 5' which arm engages the upper bridge section.

FIGS. 25 and 26 illustrate the mutual guiding of the box-shaped beams 2 and 5'. At the front end of the non-displaceable beam 2 at both sides on top and at the bottom, rollers 40 are journalled between which the extensible beam 5 is guided. The outer end of beam 5 has at the top thereof two rollers 41 which are guided in the interior of the non-displaceable beam between the upper cover plate and the inwardly extending webs. FIG. 26 illustrates in dot-dash lines rollers 49 which are journalled on the right-hand side of the lower chord of the bridge beam. These rollers 49 engage the bottom side of lateral flanges of the non-displaceable beam 2 and will thus prevent a tilting over of the advanced bridge.

With a bridge builder according to FIGS. 1 and 2, the additional telescopically extensible beam sections are arranged one within the other in the same manner as it is shown for the two-sectional beam in FIGS. 25 and 26. The rollers and the cables for the advancing and pulling back are located in the lateral spaces between the vertical webs of the box-shaped beams. Such cable arrangements by means of which the beam sections telescopically arranged one within the other can either simultaneously or successively be moved in and out are not illustrated inasmuch as arrangements of this type are well known in the art. The hose conduits for the hydraulic control of the tilting arm 9 which conduits move with the extensible beam 5 or 5' have likewise not been shown in the drawings in order not unnecessarily to clog up the drawings.

The arm 9 which is tiltable on the extensible arm 5 or 5' is in conformity with FIGS. 26 and 28 adapted to be adjusted by three double acting hydraulic cylinder piston systems which on one hand are pivotally connected to the end web 42 of the arm and on the other hand are pivotally connected to the beam 5 or 5'. The intermediate cylinder 43 is pivotally connected to the beam at 44, whereas the two outer cylinders 45 are pivotally connected to the beam by two coaxial joints 46. The location of the joints is determined on one hand by the various tilting movements required and on the other hand by the respective magnitude of the moments to be employed. The hydraulic control movements respectively required at the various tilting positions may be effected automatically by means of two control cams 47 adapted to be turned with the arm 9. The cams 47 act upon control valves 48 thereby shifting the cylinders 43 at certain tilting positions from pull to pressure and vice versa. In the tilting position A, the arm 9 is moved in the direction of the arrow by the pulling force of the outer cylinder 45 and the pressing force of the intermediate cylinder 43. Within the range of the tilting position B, the intermediate cylinder 43 is shifted from pressure to pull and will together with the two outer cylinders pull the arm 9 further into the direction of the arrow over the tilting ranges C and D. Within the range E, the outer cylinders 45 are shifted from pull to pressure and will then together with the intermediate cylinder 43 shifted to pull tilt the arm into the tilting position G. By shifting the feeding lines 50 from the vehicle, arm 9 will move in opposite direction.

The rollers 19 which are located on both sides on the beam 5 or 5' and on which the assembled bridge is advanced, are coaxially arranged with regard to the pivot 8 for the arm 9. The rollers 20 arranged on both sides on the free end of the tiltable arm 9 will when the free bridge end is deposited in conformity with FIGS. 16 and 21, engage from below inwardly directed flanges of the bridge webs.

FIGS. 29 and 30 illustrate how insertable bolts 53 arranged within the hollow shafts of the rollers 20 are displaceable by means of cylinders 54 coaxially arranged on the tilting arm in order to engage the bores of the intermediate webs 13 for coupling the bridge sections together. The feeding lines 55 for the hydraulic cylinders may be branched off from conduits 50 for the cylinders 43 and 45 directly in the vicinity of the tilting arm and may be controlled by means of electromagnetically operable reversing valves 56. In this way, long hydraulic conduits leading to the vehicle will be avoided.

The drive and control of all movable elements is preferably effected hydraulically. Individual operations of movement may be brought about by manually operable valves. The course of operation for the coupling together of the bridge as well as for the depositing of the bridge on the banks is expediently effected by mechanical controls or electric contact controls. Such devices are well known in the art and, therefore, it does not appear to be necessary to describe the same in this connection.

The bridge builder according to the present invention has been described with a two-sectional bridge only. However, it is within the scope of the present invention also to build bridges which are composed of three or more sections. With a three-sectional bridge, for instance, the end sections could toward the free end thereof be provided with decreasing height similar to the two sections of a two-sectional bridge, whereas the intermediate bridge section could have the same height throughout its length. It is merely important in each instance a symmetry of the assembled bridge exists with regard to an intermediate transverse plane so that the picking up of the bridge will be possible from both ends.

It is also possible to modify the alternate symmetry of the connecting elements as described in the embodiments (FIG. 22).

The bridge builder according to the present invention, which comprises a vehicle and at least two sections adapted to be composed to a bridge and to be arranged in superimposed position during the transport of the bridge sections on the vehicle and which furthermore comprises means for assembling the bridge sections and building the bridge, is characterized primarily in that bridge sections are of the same design with regard to the end faces to be connected and is furthermore characterized in that at least one beam is provided which is extensible in the longitudinal direction of the bridge and is connected to the free end of the upper bridge section in order to displace the latter relative to the lower bridge section into position for assembly. The identical design of the bridge sections or their ends to be connected makes it possible to pick up the bridge again from the opposite end and to disassemble the same into its sections in a reverse sequence with regard to the bridge building operation and then to stack the bridge sections again one above the other on the vehicle. These operations are carried out with the extensible beam while the heretofore customary mutual guiding of the bridge sections is at least partially discarded.

Advantageously, the extensible beam is mounted on the vehicle below the bridge sections and is by means of an arm which is pivotally arranged for tilting about a horizontal axis connected to the upper bridge section. The arm is first directed upwardly in order to overcome the distance and height resulting from the thickness of the lower bridge section.

When advancing the upper bridge section, and preferably near the end of this advancing step, the said arm is so tilted that the free end of the bridge section is placed upon the extensible beam. The tilting operation of the arm may by a suitable selection of the supporting area also be used for placing the other end which is to be connected to the lower bridge section, upon the beam.

It is further possible to carry out the advancing of the beam and the tilting of the arm by means of mechanical devices. Preferably, the arm may be tilted by a hydraulic cylinder piston system which is pivotally connected to the tilting shaft on the extensible beam.

According to the present invention, the vehicle is provided with a displacing device, preferably a follower chain which displaces the lower bridge section in opposite direction with regard to the displaceable beam into the position for the assembly. Both bridge sections will in such circumstances have to be displaced only by approximately half their length in order to reach the coupling position, and the center of gravity of the bridge remains for the time being approximately over the center of the vehicle.

The extensible beam is advantageously guided within a beam which is non-displaceable on the vehicle and which also comprises the device for displacing the lower bridge section.

The non-displaceable beam may at both sides be equipped with rollers on which the lower bridge section rests during the transport and after the assembly of the bridge. Similarly, the extensible beam may at both sides thereof carry rollers on which the upper bridge section is displaceable prior to the assembly and on which the bridge is displaceable after the assembly. The thus provided roller guiding means and the displacing device may be used for advancing the assembled bridge over the respective obstacle. Beams which protrude beyond the front end of the vehicle for advancing a one-sectional bridge are known per se, as for instance disclosed in French Patent 863,617, FIG. 4.

In order to be able to deposit the free end of the bridge after the advancement thereof upon the opposite side of the obstacle, it is further suggested that the non-displaceable beam on the vehicle is pivotally mounted for pivoting about a horizontal transverse axis. This may be effected by means of hydraulic cylinder piston systems pivotally connected to the vehicle and the beam. However, if desired, such cylinder piston systems may instead also be built into the vehicle and may support the beam by means of a roller mounted at the end of the piston rod of the respective cylinder piston system. For the same purpose, also other mechanical means may be used as, for instance, a motor driven threaded spindle.

When a one-sectional displaceable beam is provided, it is then necessary to absorb the tilting moment which acts upon the vehicle during the advancing of the bridge by means of supporting members which are adapted to be lowered at the front end of the vehicle. This, however, may according to a further development of the invention be avoided by making the displaceable beam of two or more guided sections of such a total length that the free end is adapted to be supported by the ground on the other side of the obstacle to be bridged. The extended beam then forms a light bridge beam over which the bridge to be built is moved. The tilting arm may again be used for depositing the free bridge end. Subsequently, the telescopic beam is pulled back from underneath the bridge. The moving-in and moving-out of the beam sections is advantageously effected by means of cables passing over rollers as it is known per se in connection with telescopic masts and extensible ladders.

Furthermore according to the present invention, the arm which is pivotable on the extensible beam has its free end on both sides thereof equipped with rollers by means of which it is adapted to pass under laterally inwardly protruding flanges of the bridge for depositing that end of the bridge which is adjacent to the vehicle.

It is, of course, to be understood that the present invention is, by no means, limited to the constructions above referred to but also comprises any modifications within the scope of the appended claims.

What we claim is:

1. A bridge builder, which includes a vehicle, at least two bridge sections arranged in superimposed position with regard to each other for transport by said vehicle, said bridge section also being movable relative to each other from said superimposed position to an aligned position in which they form an extension of each other, beam means extensible in the longitudinal direction of said bridge section, guide means telescopically supporting said beam means and pivotally connected to said vehicle, arm means operatively interconnecting one end of said beam means and the upper one of said bridge sections in superimposed position of said bridge sections and operable to move said upper bridge section into alignment with the adjacent bridge section as said beam means is moved outwardly for building up a bridge structure, drive means for moving said beam means outwardly of said guide means, and cylinder means including a piston means reciprocable therewith between said one end of said beam means and said upper one of said bridge sections to tilt said arm means and move said upper bridge section into alignment with the lower bridge section.

2. A bridge builder according to claim 1, in which said extensible beam means is arranged below said bridge sections, and in which said arm means operatively interconnecting said beam means and said upper bridge section includes arm means pivotable about a horizontal axis on said beam means and pivotally connected to said upper bridge section.

3. A bridge builder according to claim 2, which includes hydraulic cylinder piston means pivotally connected to said extensible beam means for pivoting said arm means, said pivotal connection of said hydraulic cylinder piston means with said extensible beam means being eccentrically located with regard to said horizontal pivot axis of said arm means.

4. A bridge builder according to claim 2, which includes roller means arranged at opposite sides of said arm means, said bridge sections being provided with inwardly extending flange means for depositing the respective rear end of the bridge structure.

5. A bridge builder according to claim 1, which includes displacing means associated with said vehicle and operatively connected to said lower bridge section in superimposed position of said bridge sections for moving said lower bridge section in a direction in which said beam means is extensible.

6. A bridge builder according to claim 5, in which said displacing means includes a follower chain.

7. A bridge builder according to claim 5, in which said extensible beam means includes a non-extensible section connected to said vehicle and containing said displacing means.

8. A bridge builder according to claim 7, in which said non-displaceable section comprises roller means at both sides thereof for supporting the lower bridge section during the transport of said bridge sections in superimposed position and after said bridge sections form a bridge structure.

9. A bridge builder according to claim 1, in which said extensible beam means is at both sides thereof provided with roller means for supporting the upper bridge section in superimposed position of said bridge sections and for supporting the bridge structure during the building of the bridge.

10. A bridge builder according to claim 1, in which said extensible beam means includes telescopically extensible sections of such a length that the free end of said extensible beam means will bridge the maximum width of an obstacle for which said bridge builder is designed.

11. A bridge builder according to claim 7, which includes fluid operable cylinder piston means having one end portion connected to said vehicle and having the other end portion connected to said non-displaceable section of said extensible beam means, said last mentioned connection being spaced in longitudinal direction of said beam means from the pivotal connection of the latter with said vehicle.

12. A bridge builder according to claim 1, which includes fishplate means and bolts for extending through said fishplate means and the chords of said bridge sections for interconnecting said bridge sections in aligned and abutting position.

13. A bridge builder according to claim 12, in which said fishplate means are alternately connected to said bridge sections by bolts firmly inserted therein.

14. A bridge builder according to claim 12, in which the lower chords of said bridge sections have a double box profile for receiving said fishplate means.

15. A bridge builder according to claim 12, which includes means common to the upper and lower chords of said bridge sections for inserting and withdrawing said bolts.

16. A bridge builder according to claim 1, in which said extensible beam means includes a non-displaceable beam section and at least one displaceable beam section, and in which said bridge sections are provided with cavities for partially receiving said non-displaceable and said displaceable beam sections.

17. A bridge builder according to claim 1, in which said bridge sections comprise two bridge beams arranged on opposite sides of said beam means and respectively comprising a track, said bridge beams being torsion elastically interconnected by transverse webs.

References Cited

FOREIGN PATENTS 180,327    8/1962    Sweden.

JACOB L. NACKENOFF, Primary Examiner